United States Patent [19]

Moro et al.

[11] Patent Number: 5,748,772
[45] Date of Patent: May 5, 1998

[54] IMAGE PROCESSING METHOD AND APPARATUS INCLUDING AN ERROR CALCULATION FOR CALCULATING A DIFFERENCE BETWEEN THE VALUES OF ERROR CORRECTION DATA AND STORED REPRESENTATIVE VALUES

[75] Inventors: Takahiro Moro, Shiki; Katsumi Masaki; Ken Onodera, both of Yokohama; Takafumi Sawaki, Kawasaki; Atsushi Ushiroda, Machida, all of Japan

[73] Assignee: Canon Kabushiki Kaisha, Tokyo, Japan

[21] Appl. No.: 794,769

[22] Filed: Feb. 3, 1997

Related U.S. Application Data

[63] Continuation of Ser. No. 276,312, Jul. 18, 1994, abandoned.

[30] Foreign Application Priority Data

Jul. 19, 1993 [JP] Japan ................... 5-178155

[51] Int. Cl.[6] .................................................. G06K 9/00
[52] U.S. Cl. ........................... 382/167; 358/456; 382/252
[58] Field of Search ................................... 382/167, 252, 382/270; 358/443, 444, 430, 530, 456, 459

[56] References Cited

U.S. PATENT DOCUMENTS

| | | | |
|---|---|---|---|
| 4,783,837 | 11/1988 | Kawamura et al. | 382/270 |
| 4,876,610 | 10/1989 | Ohsawa et al. | 358/443 |
| 4,878,125 | 10/1989 | Katayama et al. | 358/443 |
| 4,891,710 | 1/1990 | Nakazato et al. | 358/443 |
| 4,958,236 | 9/1990 | Nagashima et al. | 358/445 |
| 4,958,238 | 9/1990 | Katayama et al. | 358/456 |
| 4,975,786 | 12/1990 | Katayama et al. | 358/459 |
| 5,008,950 | 4/1991 | Katayama et al. | 382/50 |
| 5,014,124 | 5/1991 | Fujisawa | 358/530 |
| 5,086,484 | 2/1992 | Katayama et al. | 382/50 |
| 5,159,470 | 10/1992 | Ishida et al. | 358/443 |
| 5,267,330 | 11/1993 | Masuda | 382/270 |
| 5,283,664 | 2/1994 | Fujisawa et al. | 358/429 |
| 5,307,425 | 4/1994 | Otsuka | 382/270 |
| 5,315,669 | 5/1994 | Kumagai | 382/270 |
| 5,363,202 | 11/1994 | Udagawa et al. | 358/501 |

*Primary Examiner*—Yon Couso
*Assistant Examiner*—Jayanif K. Patel
*Attorney, Agent, or Firm*—Fitzpatrick, Cella, Harper & Scinto

[57] ABSTRACT

An image processing apparatus of a digital copying machine, a digital facsimile, or a printer comprises an input unit to input multi-level data; an arithmetic operating circuit for adding error data to the input multi-level data and for calculating error correction data; a selector to select a predetermined dot pattern on the basis of the error correction data; an error calculation circuit to calculate a difference between the representative value for each dot pattern and the error correction data; a storage memory for storing the difference as error data into a memory; and a dot pattern memory in which dot patterns corresponding to a plurality of colors have been stored. The input unit inputs multi-level image data of a plurality of colors and the selector selects the dot pattern whose dot arrangement differs in accordance with the color of the multi-level image data.

8 Claims, 9 Drawing Sheets

FIG. 2

| DATA LEVEL | DENSITY f (i, j) |
|---|---|
| 0 | $-8 \leq f(i,j) < 8$ |
| 1 | $8 \leq f(i,j) < 24$ |
| 2 | $24 \leq f(i,j) < 40$ |
| 3 | $40 \leq f(i,j) < 56$ |
| 4 | $56 \leq f(i,j) < 72$ |
| 5 | $72 \leq f(i,j) < 88$ |
| 6 | $88 \leq f(i,j) < 104$ |
| 7 | $104 \leq f(i,j) < 120$ |
| 8 | $120 \leq f(i,j) < 136$ |
| 9 | $136 \leq f(i,j) < 152$ |
| 10 | $152 \leq f(i,j) < 168$ |
| 11 | $168 \leq f(i,j) < 184$ |
| 12 | $184 \leq f(i,j) < 200$ |
| 13 | $200 \leq f(i,j) < 216$ |
| 14 | $216 \leq f(i,j) < 232$ |
| 15 | $232 \leq f(i,j) < 248$ |
| 16 | $248 \leq f(i,j) < 264$ |

MAGENTA PATTERN

PATTERN 0   PATTERN 1   PATTERN 2   PATTERN 3

PATTERN 4   PATTERN 5   PATTERN 6   PATTERN 7

PATTERN 8   PATTERN 9   PATTERN 10   PATTERN 11

PATTERN 12   PATTERN 13   PATTERN 14   PATTERN 15

PATTERN 16

CYAN PATTERN

PATTERN 0   PATTERN 1   PATTERN 2   PATTERN 3

PATTERN 4   PATTERN 5   PATTERN 6   PATTERN 7

PATTERN 8   PATTERN 9   PATTERN 10   PATTERN 11

PATTERN 12   PATTERN 13   PATTERN 14   PATTERN 15

PATTERN 16

FIG. 6

| DATA LEVEL | THRESHOLD VALUE FOR EACH LEVEL |
|---|---|
| 0 | 0 |
| 1 | 16 |
| 2 | 32 |
| 3 | 48 |
| 4 | 64 |
| 5 | 80 |
| 6 | 96 |
| 7 | 112 |
| 8 | 128 |
| 9 | 144 |
| 10 | 160 |
| 11 | 176 |
| 12 | 192 |
| 13 | 208 |
| 14 | 224 |
| 15 | 240 |
| 16 | 256 |

PATTERN 0　　PATTERN 1　　PATTERN 2　　PATTERN 3

PATTERN 4　　PATTERN 5　　PATTERN 6　　PATTERN 7

PATTERN 8　　PATTERN 9　　PATTERN 10　　PATTERN 11

PATTERN 12　　PATTERN 13　　PATTERN 14　　PATTERN 15

PATTERN 16

1

IMAGE PROCESSING METHOD AND APPARATUS INCLUDING AN ERROR CALCULATION FOR CALCULATING A DIFFERENCE BETWEEN THE VALUES OF ERROR CORRECTION DATA AND STORED REPRESENTATIVE VALUES

This application is a continuation of application Ser. No. 08/276,312, filed Jul. 18, 1994, now abandoned.

BACKGROUND OF THE INVENTION

1. Field of the Invention

The invention relates to image processing method and apparatus for binarizing input multi-level image data into binary data.

2. Related Background Art

Hitherto, in an image processing apparatus of a digital copying machine, a digital facsimile, a printer, and the like, input multi-level image data is binarized into binary data.

Particularly, in the case where the input image data is color image data of Y (yellow), M (magenta), and C (cyan), when a binarizing process is executed to such color image data for every color, a binarization processing method such as a dither method, density pattern method, or an error diffusion method has been used.

As inventions regarding the error diffusion method, the same applicant as that of the present invention has already filed received U.S. Pat. Nos. 4,876,610, 4,878,125, 5,008,950, 4,958,236, 4,975,786, 4,958,238, and 5,086,484.

When a binarizing method which can control a portion to which a dot pattern is printed like a dither method or a density pattern method is used, the generation of a moire or square noises can be suppressed. However, since errors which are generated upon binarization cannot be propagated, the binarization in which a density of image data is held cannot be performed. Therefore, a highly fine binarization with a gradation expressing performance cannot be performed.

When a binarizing method such that by propagating errors which are generated upon binarization as in an error diffusion method, the binarization can be performed while maintaining a density of image data is used, although the gradation expressing performance can be assured, there is a drawback such that pier panel noises are generated due to a pier panel phenomenon.

SUMMARY OF THE INVENTION

It is an object of the invention to eliminate the drawbacks of the conventional technique mentioned above and to provide an image processing method and apparatus which can perform a binarizing process in which a moire, square noises, and pier panel noises are small, a gradation expressing performance is high, and a picture quality is high.

Another object of the invention is to provide an image processing method and apparatus which can obtain an image of a high picture quality by a simple construction.

Still another object of the invention is to provide an image processing method and apparatus in which data is divided into several levels, dot patterns corresponding to the levels are allocated, an error is calculated from the data level and a threshold value according to the data level, the error is diffused, and the dot pattern which is used for each color is changed, so that a color image of a high picture quality can be obtained at a high speed.

Further, another object of the invention is to provide an image processing method and apparatus in which by changing the gradation of color multi-level data to a lower gradation and allocating a dot pattern corresponding to the changed gradation, the binarization is performed, and by diffusing errors which are generated upon changing to pixels after a target pixel and by using a different dot pattern for every color, an excellent gradation performance can be obtained and the moire which is generated when the binarization is executed can be reduced.

Further, another object of the invention is to provide an image processing method and apparatus in which by changing the gradation of multi-level data to a lower gradation and by allocating a dot pattern according to the changed gradation, the binarization is performed, and by diffusing errors which are generated at the time of changing to pixels after a target pixel and by setting the dot pattern such that the dots are not neighboring as close as possible, a high fineness is obtained and the generation of square noises can be suppressed upon binarization.

The above and other objects and features of the present invention will become apparent from the following detailed description and the appended claims with reference to the accompanying drawings.

BRIEF DESCRIPTION OF THE DRAWINGS

FIG. 2 is a diagram showing data levels for density data after completion of the error correction;

FIG. 6 is a diagram showing threshold values for each level indicative of the output densities of the data levels;

DETAILED DESCRIPTION OF THE PREFERRED EMBODIMENTS

[First embodiment]

An embodiment of the invention will be described hereinbelow with reference to the drawings. The invention is not limited to such an embodiment but the invention can be accomplished in an apparatus or a system comprising a plurality of apparatuses. It will be obviously understood that the invention also can be applied to a case of accomplishing the invention by supplying a program to an apparatus or a system.

Figure 1:
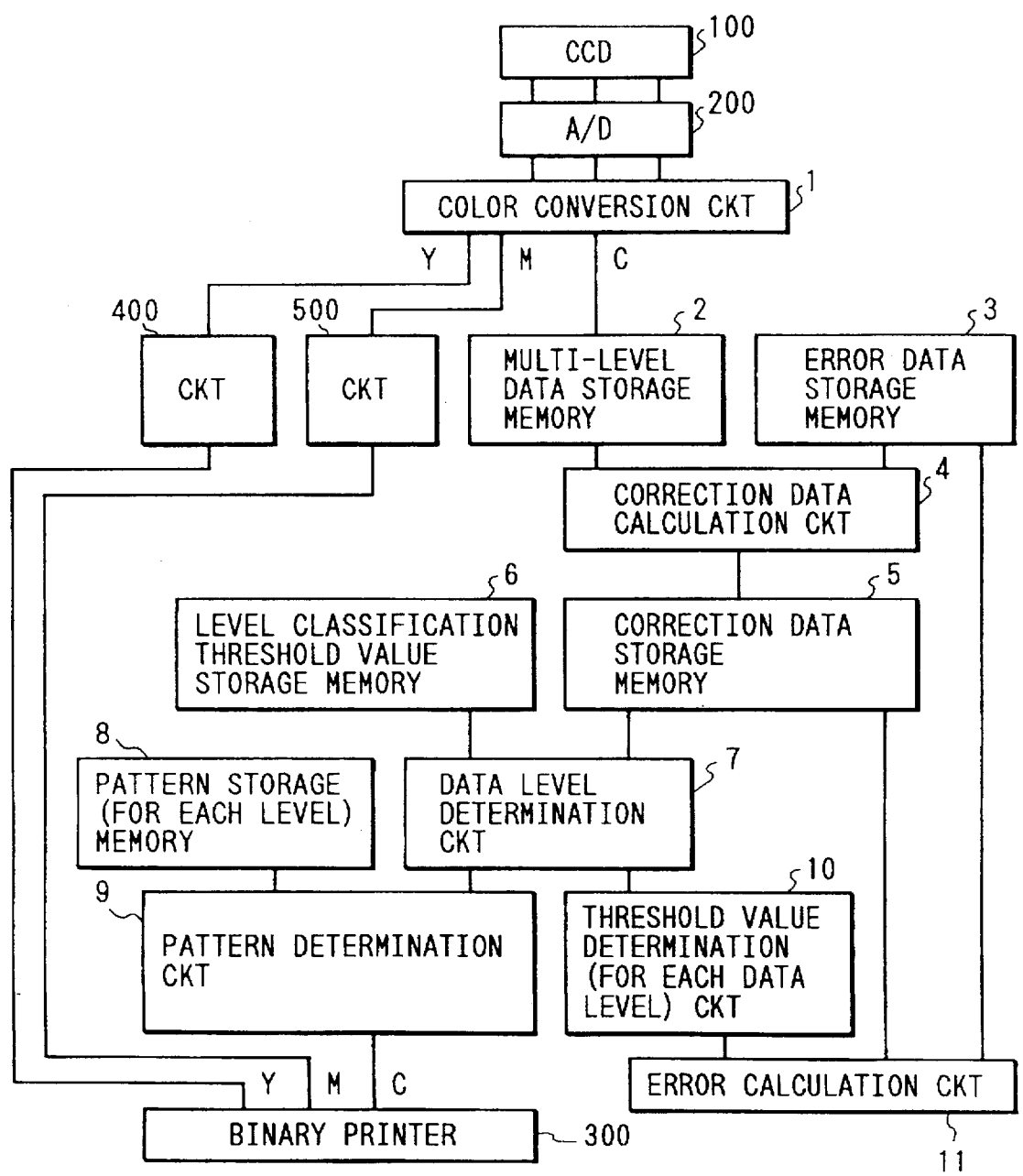
FIG. 1 is a block diagram showing a construction of an image processing apparatus in the first embodiment of the invention.

FIG. 1 is a block diagram showing a construction of an image processing apparatus according to the embodiment of the invention.

In FIG. 1, reference numeral 100 denotes a CCD for reading an image of an original and generating analog data of each color of R, G, and B. Reference numeral 200 denotes an A/D converter for converting the analog data sent from the CCD 100 into the digital data of one pixel and eight bits for each color of R, G, and B. Reference numeral 1 denotes a color conversion circuit for converting each of the R, G, and B data into the data of one pixel and eight bits for each color of Y, M, and C by a masking process. In the case where an output apparatus is the RGB system, the above converting process is unnecessary. A necessary image process such as γ conversion or the like is also executed in the color conversion circuit 1. In the above description, there is used a construction such that the data is input through the CCD 100 and A/D converter 200. However, the embodiment also can be applied even in a case of a construction such that the data is input from a host computer. When the Y, M, and C data which is used by a printer is sent from the host computer, the processes in the color conversion circuit 1 as mentioned above can be omitted.

The Y, M, and C data from the color conversion circuit 1 is binarized into the binary data for every color. However, since component elements 2 to 11 of a circuit for the binarizing process which is used for each color is substantially the same, those component elements will be described hereinbelow with respect to the circuit of C. Reference numerals 400 and 500 denote circuits including the component elements 2 to 11.

Figure 3:
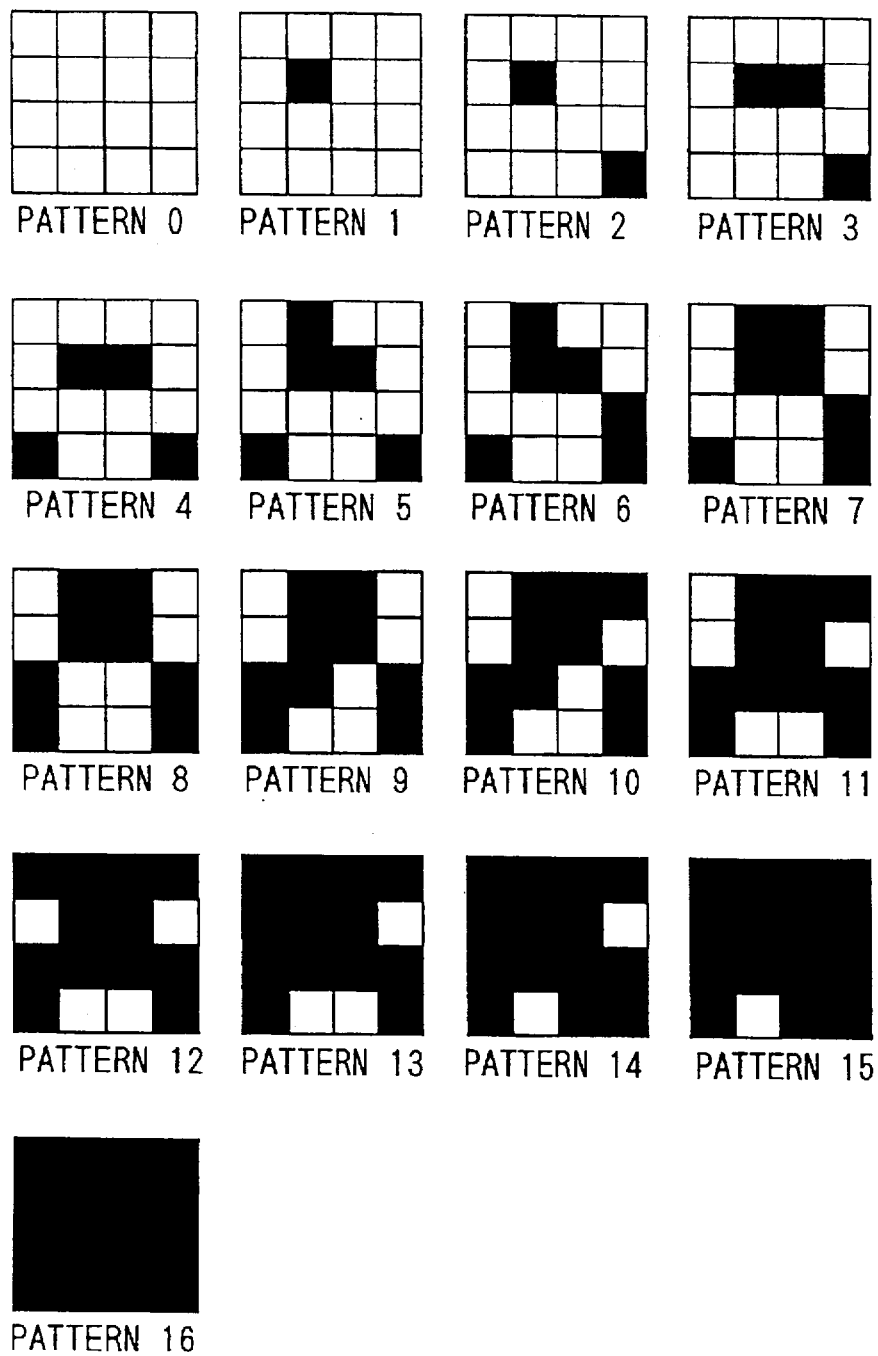
FIGS. 3 to 5 are diagrams showing examples of density patterns of respective colors.
Figure 4:
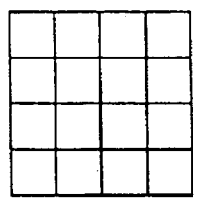
Figure 4:
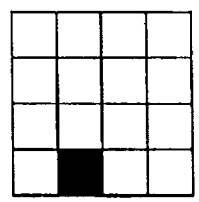
Figure 4:
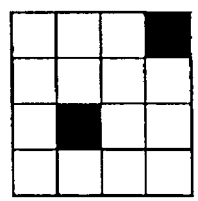
Figure 4:
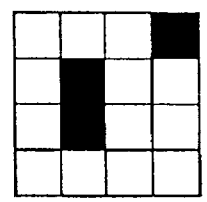
Figure 4:
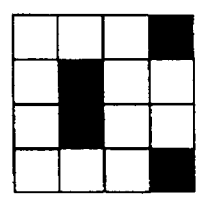
Figure 4:
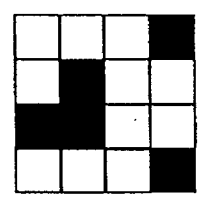
Figure 4:
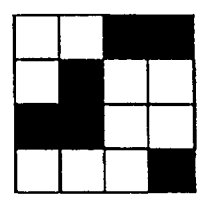
Figure 4:
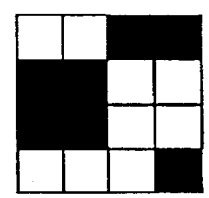
Figure 4:
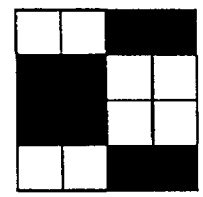
Figure 4:
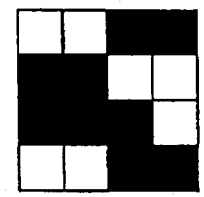
Figure 4:
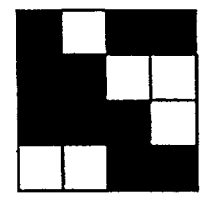
Figure 4:
Figure 4:
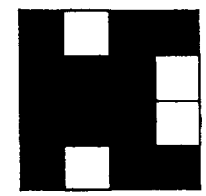
Figure 4:
Figure 4:
Figure 4:
Figure 4:
Figure 5:
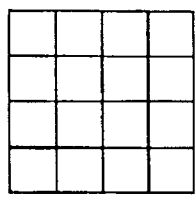
Figure 5:
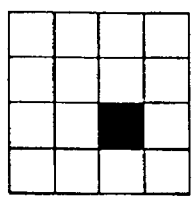
Figure 5:
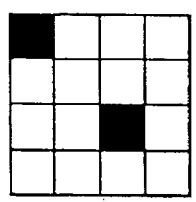
Figure 5:
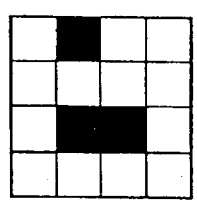
Figure 5:
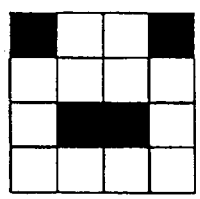
Figure 5:
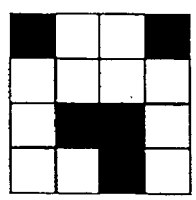
Figure 5:
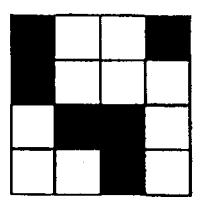
Figure 5:
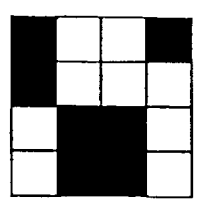
Figure 5:
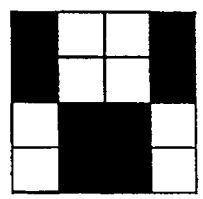
Figure 5:
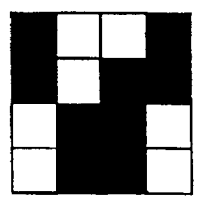
Figure 5:
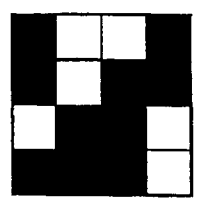
Figure 5:
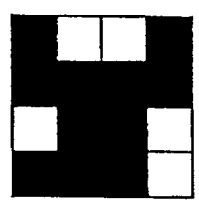
Figure 5:
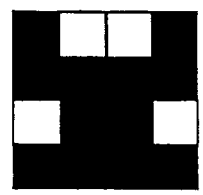
Figure 5:
Figure 5:
Figure 5:
Figure 5:

Reference numeral 2 denotes a multi-level data storage memory for storing the color converted multi-level data; 3 an error data storage memory for storing errors which are generated when the multi-level data is binarized by the present apparatus; 4 a correction data calculation circuit for calculating the multi-level data after completion of the error correction by adding the multi-level data stored in the multi-level data storage memory 2 and the error data stored in the error data storage memory 3; 5 a correction data storage memory for storing the error corrected data which was calculated by the correction data calculation circuit 4; and 6 a level classification threshold value storage memory in which threshold values for classifying the corrected data into the levels have been stored. FIG. 2 shows the details of the level classification threshold value storing circuit. Reference numeral 7 denotes a data level determination circuit for deciding the level of the corrected data by comparing the error corrected data stored in the correction data storage memory 5 and the threshold value stored in the level classification threshold value storage memory 6. Reference numeral 8 denotes a pattern storage (for each level) memory to store the dot pattern for each level. FIGS. 3, 4, and 5 show patterns stored in the pattern storage (for each level) memory 8.

FIG. 3 shows the dot pattern for Y stored in a pattern storage (for each level) memory in the circuit 400.

FIG. 4 shows the dot pattern for M stored in a pattern storage (for each level) memory in the circuit 500.

FIG. 5 shows the dot pattern for C stored in the pattern storage (for each level) memory 8.

As a dot pattern which is used in the invention, a pattern such that the dots are not neighboring is used. For example, in a case of a pattern which is constructed by 16 (4×4) dots as a whole and in which eight dots are fully painted, a pattern except a pattern such that all of the eight dots are neighboring is used. Further, in order to improve a color reproducibility for the dot pattern which is used in the invention, it is necessary to use an increasing method such that one dot is added to the dot pattern whose gradation is lower by one level when increasing the number of dots (so as to obtain the same dot pattern when the increased dot pattern is eliminated).

Reference numeral 9 denotes a pattern determination circuit to determine the dot pattern stored in the pattern storage (for each level) memory 8 in accordance with the level of the error corrected data which was decided by the data level determination circuit 7. The data from the pattern determination circuit 9 is sent to a binary printer 300. Reference numeral 10 denotes a threshold value determination (for each data level) circuit for deciding the threshold value in accordance with the level of the error corrected data which was determined by the data level determination circuit 7. FIG. 6 shows threshold values for every data level. The threshold value corresponds to an output density of the dot pattern. Reference numeral 11 denotes an error calculation circuit to calculate errors which are generated upon binarization by subtracting the threshold value (for each data level) determined by the threshold value determination (for each data level) circuit 10 from the error corrected data stored in the correction data storage memory. The errors are stored into the error data storage memory. As for the error data stored in the error data storage memory 3, a predetermined weight is added to a plurality of input multi-level data which are not subjected to the binarizing process and the weighted data is diffused.

Processes of the circuit in FIG. 1 will now be described hereinbelow.

The image data sent from the color conversion circuit is stored into the multi-level data storage memory 2. The data read out from the multi-level data storage memory 2 is added to the error data from the error data storage memory 3 by the correction data calculation circuit 4. The error data to be added here is generated from the pixels which have already been subjected to the binarizing process. The data after completion of the error correction is once stored into the correction data storage memory 5 and sent to the data level determination circuit 7. The data level is determined in dependence on whether the level of the error corrected data belongs to which level of f(i, j) shown in FIG. 2.

The pattern determination circuit 9 selects one of a plurality of patterns shown in FIG. 5 in accordance with the decided data level and sends the binary dot pattern to the binary printer 300. The binary printer 300 on/off controls the dots and forms an image in accordance with the dot pattern supplied.

The level decided by the data level determination circuit 7 is also sent to the threshold value determination (for each data level) circuit 10. The threshold value (for each level) shown in FIG. 6 is obtained in accordance with the data level and sent to the error calculation circuit 11. The error calculation circuit 11 calculates an error between the data from the correction data storage memory 5 and the threshold value (for each level) and stores the error value into the error data storage memory 3.

When the value of "150" is sent as error corrected data from the correction data storage memory 5 to the data level determination circuit 7, the data level determination circuit 7 selects "9" as a data level. The pattern determination circuit 9 selects the dot pattern of the level 9 in FIG. 5.

The threshold value determination (for each data level) circuit 10 sends the threshold value "144" for each level to the error calculation circuit 11. The error calculation circuit 11 stores a difference "–6" between "150" and "144" into the error data storage memory 3.

According to the embodiment as described above, the data is divided into several levels, the dot patterns corresponding to the levels are allocated, the error between the data level and the threshold value according to the data level is calculated, and the error is diffused, so that the binarizing process can be performed at a high speed and at a high fineness.

According to the embodiment, moreover, simultaneously with the binarizing process, the data input at a low density (for example, 100 dpi) can be converted into the data of a high density (400 dpi) in both the main and sub scan direction, so that an image of a high picture quality can be obtained.

Further, in the embodiment, the level classification threshold value storage (for each level) memory 6, data level determination circuit 7, threshold value determination (for each data level) circuit 10, and error calculation circuit 11 are constructed by an ROM. The data from the correction data storage memory 5 is set to the address data and the data level value, threshold value (for each data level), and error data are generated.

The high speed binarizing process, consequently, can be realized by a simple circuit construction.

According to the embodiment, further, since different dot patterns as shown in FIGS. 3 to 5 are used as dot patterns which are respectively used for Y, M, and C, a color image of a high fineness and a high picture quality in which the generation of the color moire is suppressed can be obtained.

Moreover, since the number of dots (black dots) in which the dots of Y, M, and C are printed so as to overlap is reduced, a phenomenon such that the black dots are collectively printed is suppressed and the black dots can be distributed. Thus, an image of a high picture quality can be obtained.

In the above embodiment, the binary data of (4×4) pixels has been formed for one pixel of the multi-level data. However, as data to be formed, it is possible to use the data consisting of n×m (n, m: integers of two or more). The number of patterns in this instance is equal to (n×m+1). When n=m, the binarization can be performed while increasing the original data by an integer times. When n≠m, the binarization can be executed while increasing the original data n times in the vertical direction and m times in the lateral direction.

[Second embodiment]

In the first embodiment, although the density pattern has been determined by the table conversion constructed by the ROM, the density pattern also can be obtained by an arithmetic operation.

Figure 7:
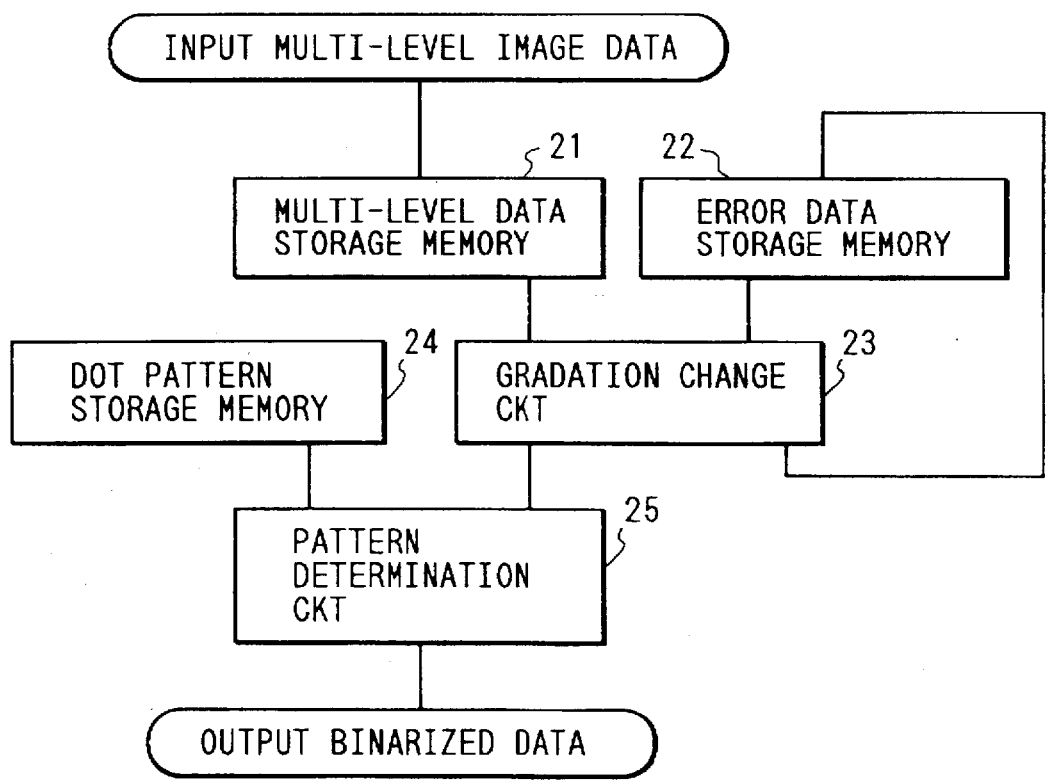
FIG. 7 is a block diagram showing a construction of an image processing apparatus according to the second embodiment of the invention.

An embodiment in such a case is shown in FIG. 7.

In the diagram, reference numeral 21 denotes a multi-level data storage memory for storing the multi-level image data on the processing side to execute the binarizing process. It is now assumed that the data of, for example, 100 (256 gradations) is stored in the memory 21. Reference numeral 22 denotes an error data storage memory to store the error data which is generated when the multi-level data is binarized by using the present apparatus. The memory 22 is a storage memory to store the binarized error generated in a case of binarizing the pixel which is one-preceding to the pixel (target pixel) to be subjected to the binarizing process at present. For example, it is assumed that four (256 gradations) data are stored. Reference numeral 23 denotes a gradation change circuit for obtaining multi-level image data of a gradation lower than the gradation of the multi-level image data from the data which is obtained by adding the multi-level image data stored in the multi-level data storage memory 21 and the error data stored in the error data storage memory 22 and for further calculating an error. For example, it is assumed that the quotient=6 which is obtained by dividing the value=104 (which is derived by adding the target pixel=100 of 256 gradations and the error data=4) by 16 in order to obtain 16 gradations is set to the converted gradations and that the remainder=8 at that time is calculated as an error. The error data calculated by the gradation changing circuit is stored into the error data storage memory 22. Reference numeral 24 denotes a dot pattern storage memory to store the dot patterns of the new gradation number of the multi-level data which was changed by the gradation changing circuit. The different dot patterns for the respective colors Y, M, and C shown in FIGS. 3, 4, and 5 of the first embodiment are stored in the dot pattern storage memory 24. As a dot pattern which is used in the invention, a pattern such that the dots are not neighboring is used. For example, in a case of the pattern which is constructed by 16 (4×4) dots as a whole and in which eight dots are fully painted, a pattern except the pattern such that all of eight dots are neighboring is used. To improve color reproducibility of the dot patterns which are used in the invention, it is necessary to use an increasing method such as to add one dot to the dot pattern whose gradation is lower by one level when increasing the number of dots (so as to obtain the same dot pattern when the increased dot pattern is eliminated).

Reference numeral 25 denotes a pattern determination circuit for performing the binarization by allocating the dot patterns stored in the dot pattern storage memory 24 in accordance with the gradation of the data changed by the gradation changing circuit 23. For example, since the gradation of the multi-level data has been set to "6" by the gradation changing circuit 24 here, the binarization is executed by allocating the pattern "6". By executing the above processes with respect to all of the pixels of the multi-level image data, the binarizing process can be executed.

A method of determining the dot patterns in FIGS. 3 to 5 used in the above first and second embodiments will now be described.

Figure 8:
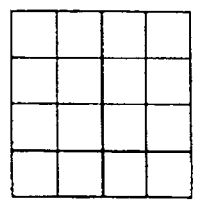
FIG. 8 is a diagram showing an example of dot patterns different from a method of deciding the dot patterns in the embodiment.
Figure 8:
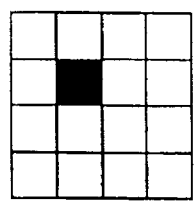
Figure 8:
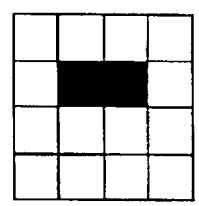
Figure 8:
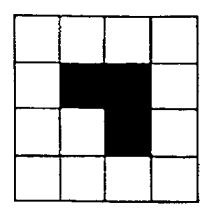
Figure 8:
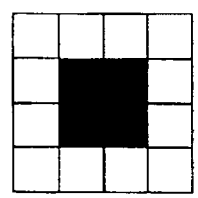
Figure 8:
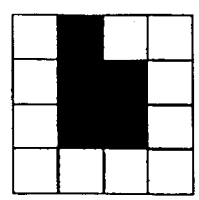
Figure 8:
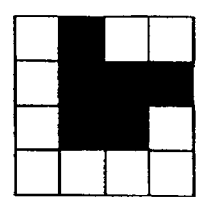
Figure 8:
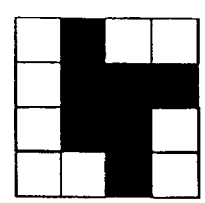
Figure 8:
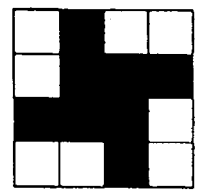
Figure 8:
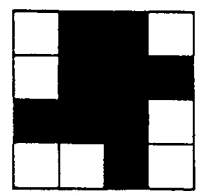
Figure 8:
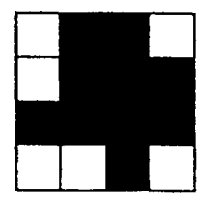
Figure 8:
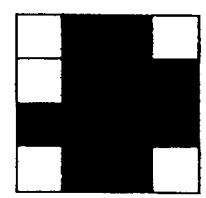
Figure 8:
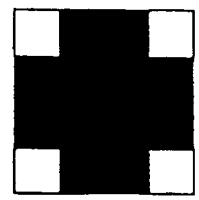
Figure 8:
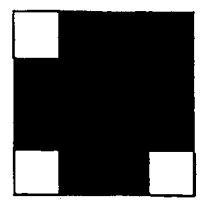
Figure 8:
Figure 8:
Figure 8:
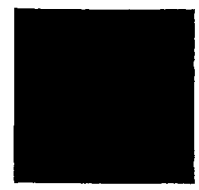

FIG. 8 shows an example in the case where the pattern is decided "so that the dots are neighboring as much as possible" by a method different from the determining method of the dot pattern according to the invention. By using such a pattern, square noises of 4×4 become conspicuous in the data which is obtained as a final binarization result.

On the other hand, as described in the first and second embodiments, if the dot pattern is decided by the method whereby "as a dot pattern, a pattern such that the dots are not neighboring is used, for example, in a case of the pattern which is constructed by 16 (4×4) dots as a whole and in which eight dots are fully painted, a pattern except the pattern such that all of eight dots are neighboring is used", the square noises can be largely suppressed.

A method of deciding the dot pattern will now be formatted as follows.

Figure 9:
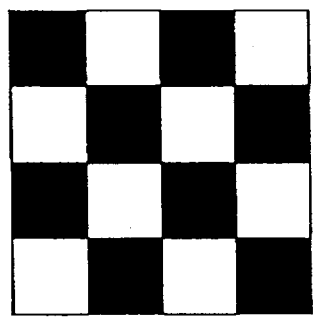
FIG. 9 is a diagram showing an example of a dot pattern adapted to a format of the embodiment.
Figure 10:
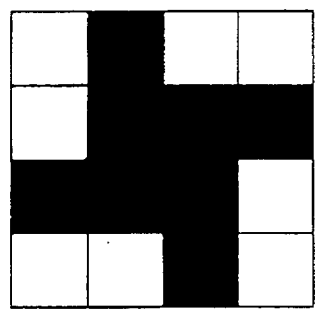
FIG. 10 is a diagram showing an example of a dot pattern which is not adapted to the format of the embodiment.

In a case of standardizing the lowest level of the gradation to 0 and the highest level to 1, the dots are arranged so as to prevent a situation such that all of the black dots (in a case of a color image, dots of YMC or dots of RGB also can be used) are neighboring in the vertical and lateral directions in the dot pattern whose gradation level is equal to or larger than 2/17 and is equal to or less than 10/17. FIG. 9 shows an example of a dot pattern adapted to such a format. FIG. 10 shows an example of a dot pattern which is not adapted to such a format. The dot patterns in FIGS. 9 and 10 relate to an example when the gradation level is equal to 8/17.

If, for example, a black pattern is arranged in accordance with the above format, the binarization in which the square noises are reduced can be performed. Even in not only a monochrome printer but also a color printer, the arrangement of dot patterns is merely different and the other construction is substantially the same.

The above formats are not limited in correspondence to all of the gradation levels which are equal to or larger than 2/17 and are equal to or less than 10/17. Even in the case where a pattern such that all of the black dots are not neighboring in the vertical and lateral direction at a partial level in the above gradation level range has been determined, the spirit of the present invention is not lost.

If the dot pattern is determined in accordance with the above formats, the binarization in which the square noises are extremely small can be realized.

In the above embodiments 1 and 2, the errors generated by the error calculation circuit and gradation changing circuit have been stored into the error data storage memory as they are. However, even by diffusing the generated errors to the pixels adjacent to the target pixel, no difference occurs in the essence such that the errors are propagated. The diffusing direction of the errors also can be arbitrarily changed.

The embodiments 1 and 2 have been described with respect to the case where the dot patterns corresponding to Y, M, and C stored in the dot pattern storing means have been made different. However, even when only a part of the patterns is made different instead of making all of the patterns different, the essence of the invention is not lost. For example, it is also possible to use the same pattern for Y and M and to make only C different. Only the pattern corresponding to a specific gradation also can be made different.

According to the embodiments as described above, by changing the gradation of the color multi-level data into a lower gradation and by allocating the dot pattern according to the changed gradation, the binarization is performed, and by diffusing the errors which are generated at the time of changing to the pixels after the target pixel, the binarization of a high fineness in which the generation of the moire is suppressed can be executed.

According to the embodiments as described above, by changing the gradation of the multi-level data to a lower gradation and by allocating the dot pattern corresponding to the changed gradation, the binarization is performed. By diffusing the errors which are generated upon changing to the pixels after the target pixel, the binarization in which the generation of the square noises at the time of the binarization are suppressed can be executed at a high fineness.

Although the invention has been described with respect to the preferred embodiments, the invention is not limited to the foregoing embodiments but many modifications and variations are possible within the spirit and scope of the appended claims of the invention.

What is claimed is:

1. An image processing apparatus comprising:

input means for inputting multi-level data;

arithmetic operating means for adding error data to the input multi-level data and for calculating error correction data;

selecting means for inputting the error correction data calculated by said arithmetic operating means and for selecting and outputting a predetermined dot pattern in accordance with the error correction data, the predetermined dot pattern being a dot pattern consisting of a plurality of pixels respectively arranged in two-dimensional directions;

a representative value storage memory in which representative values for each dot pattern have been stored;

error calculating means for calculating a difference between the value of the error correction data and the representative values stored in said representative value storage memory; and storing means for storing the difference as error data into a memory, wherein said input means inputs multi-level image data of a plurality of colors and said selecting means selects the dot pattern in which an arrangement of dots differs in accordance with the color of the multi-level image data.

2. An apparatus according to claim 1, further comprising dot pattern memory means to which the dot patterns corresponding to the plurality of colors have been stored.

3. An apparatus according to claim 2, wherein said level classification threshold value storage memory, data level determination circuit, representative storage memory, and error calculating circuit are constructed by a ROM.

4. An apparatus according to claim 2, wherein the dot pattern stored in said dot pattern memory means is a dot pattern such that the dots are not neighboring as close as possible so as to reduce square noises which are generated when the binarization is executed.

5. An apparatus according to claim 2, wherein in a case when the lowest level of the gradation is standardized to 0 and the highest level is standardized to 1, the dot pattern which is stored in said dot pattern memory means is a dot pattern such that in an least one gradation level which is equal to or larger than 2/17 and is equal to or less than 10/17, all dots of the dot pattern corresponding to the gradation are not neighboring in the vertical and lateral directions.

6. An apparatus according to claim 1, wherein said selecting means comprises:

a level classification threshold value storage memory in which threshold values to classify the error correction data into levels have been stored; and a data level determination circuit for classifying the error correction data into levels on the basis of the value of the error correction data and the values stored in the level classification threshold value storage memory.

7. An image processing method comprising:

an input step of inputting multi-value data;

an arithmetic operating step of adding error data to the input multi-level data and calculating error correction data;

a selecting step of inputting the error correction data calculated by said arithmetic operating step and for selecting and outputting a predetermined dot pattern in accordance with the error correction data, the predetermined dot pattern being a dot pattern consisting of a plurality of pixels respectively arranged in two-dimensional directions;

an error calculating step of calculating a difference between a representative value for each dot pattern stored in a representative value storage memory and the error correction data; and a storing step of storing the difference as error data into a memory, wherein, in said input step, multi-level image data of the plurality of colors are input and, in said selecting step, a dot pattern such that an arrangement of dots differs in accordance with the color of said multi-level image data.

8. An image processing apparatus for converting multi-level data to binary data, said apparatus comprising:

input means for inputting color multi-level image data;

error storage means for storing multi-level error data to be added to the multi-level data input by said input means;

calculating means for calculating multi-level error correction data by adding multi-level error data stored in said error storage means to the multi-level data input by said input means;

pattern storage means for storing a plurality of predetermined binary dot patterns, each binary dot pattern consisting of a plurality of binary pixels;

representative value storage means for storing a plurality of multi-value data, each corresponding to a respective one of the plurality of predetermined binary dot patterns stored in said pattern storage means;

determination means for inputting the multi-level error correction data calculated by said calculating means and for determining and outputting a predetermined binary dot pattern in accordance with the multi-level error correction data and a color of the multi-level error correction data;

error calculating means for calculating a difference between the multi-level error correction data and the multi-level data corresponding to the predetermined binary dot pattern determined by said determination means which is stored in said representative value storage means, and for storing the difference as multi-level error data in said error storage means.

* * * * *

UNITED STATES PATENT AND TRADEMARK OFFICE
CERTIFICATE OF CORRECTION

PATENT NO. : 5,748,772

DATED : May 5, 1998

INVENTOR(S) : TAKAHIRO MORO, ET AL.

It is certified that error appears in the above-identified patent and that said Letters Patent is hereby corrected as shown below:

COLUMN 1

Line 24, "density" should read --a density--; and
    Line 28, "filed" should be deleted.

COLUMN 5

Line 2, "sub scan" should read --sub-scan--; and
    Line 9, "an" should read --a--.

COLUMN 10

Line 2, "data;" should read --data; and--.

Signed and Sealed this

Twenty-fourth Day of November, 1998

Attest:

BRUCE LEHMAN

Attesting Officer     Commissioner of Patents and Trademarks